United States Patent [19]

Horiie et al.

[11] 3,853,978
[45] Dec. 10, 1974

[54] PROCESS FOR PREPARING A FILM OF A TAPERED COPOLYMER OF STYRENE-BUTADIENE OR MIXTURES THEREOF

[75] Inventors: Shigeki Horiie, Yokohama; Susumu Kurematsu, Zama-Machi; Shinichiro Asai; Chiaki Saito, both of Tokyo, all of Japan

[73] Assignee: Denki Kagaku Kogyo K. K., Tokyo, Japan

[21] Appl. No.: 294,832

[30] Foreign Application Priority Data
Oct. 4, 1971    Japan.............................. 46-77154
Oct. 25, 1971   Japan.............................. 46-83960

[52] U.S. Cl. ...... 264/210 R, 260/83.7, 260/94.2 M, 260/880 B, 264/92, 264/289
[51] Int. Cl. ...... B29d 7/24, C08f 19/08, C08d 3/06
[58] Field of Search ........ 260/880 B, 94.2 M, 83.7; 264/210 R, 211, 289, 95, 209, 175, 72

[56] References Cited
UNITED STATES PATENTS
3,157,604  11/1964  Strobel.......................... 260/94.2 M
3,287,333  11/1966  Zelinski........................... 260/880 B
3,629,387  12/1971  Watanabe et al............... 264/210 R
3,668,279   6/1972  Loveless et al................. 260/94.2 M

*Primary Examiner*—Jeffery R. Thurlow
*Attorney, Agent, or Firm*—Oblon, Fisher, Spivak, McClelland & Maier

[57] ABSTRACT

A tapered styrene-butadiene copolymer is extruded to form a film and a sheet. The tapered styrene-butadiene copolymer can be admixed with polystyrene and is extruded to form a film and is pressed or stretched. The tapered copolymer can be a copolymer of a molecular weight of 40,000 – 250,000 with a total styrene content of 60 – 90 weight percent and with a total butadiene content of 40 – 10 weight percent. More than 10% of the chain portion has a tapering rate of 0.3 – 4. The tapered styrene-butadiene copolymer consists of (a) more than 5% of the chain portion with a styrene content of 30 – 70 weight percent, (b) more than 35% of the chain portion with a styrene content more than 80 weight percent, and (c) more than 10% of the chain portion with a styrene content less than 50 weight percent. When the tapered copolymer of styrene-butadiene or mixtures thereof is extruded and stretched, the resulting transparent film has a high tear strength and impact strength. No white mar is formed when the film is torn or bent.

4 Claims, No Drawings

PROCESS FOR PREPARING A FILM OF A TAPERED COPOLYMER OF STYRENE-BUTADIENE OR MIXTURES THEREOF

BACKGROUND OF THE INVENTION

1. Field Of The Invention

This invention relates to a process for preparing a film of a tapered styrene-butadiene copolymer or mixtures thereof which have a high tear strength and impact strength, and do not form a white mar when the film is bent or torn.

2. Description Of The Prior Art

Biaxial oriented polystyrene films have been known which possess a very low impact strength. In order to improve the impact strength of these films, high impact polystyrene films fabricated from polystyrene and reinforced with elastomer particles have been prepared. However, these films are opaque or translucent because of the presence of the elastomer particles. In addition, these films form a white mar when they are bent.

SUMMARY OF THE INVENTION

Accordingly, it is an object of this invention to provide a process for preparing a film of a tapered copolymer of styrene-butadiene or mixtures thereof which has an excellent tear strength and impact strength, and leaves no white mar when bent or torn.

This object and other objects of this invention can be achieved by providing a process for preparing a film of a tapered copolymer of styrene-butadiene or mixtures thereof by extruding a specific tapered copolymer to provide an orientation of the copolymer chains. The specific tapered styrene-butadiene copolymer consists of chains wherein the ratio of styrene monomer units to butadiene monomer units continuously changes. The tapered styrene-butadiene copolymer has a molecular weight ranging from 40,000 to 250,000, a total styrene content of 60 – 90 weight percent and a total butadiene content of 40 – 10 weight percent. More than 10% of the chain portion has a tapering rate of 0.3 – 4. The tapered styrene-butadiene copolymer has (a) more than 5% of the chain portion with a styrene content of 30 – 70 weight percent, (b) more than 35% of the chain portion with a styrene content more than 80% and (c) more than 10% of the chain portion with a styrene content less than 50 weight percent. The tapered styrene-butadiene copolymer can be admixed or melt-admixed with polystyrene.

DESCRIPTION OF THE PREFERRED EMBODIMENTS

In the chain of the tapered styrene-butadiene copolymer, the quantity of styrene relative to butadiene continuously changes as shown in the following schematic structure. The reference numerals above the letters $b$ and $s$ designate the ratio of styrene ($s$) to butadiene ($b$) ($s : b$) or butadiene ($b$) to styrene ($s$) ($b : s$).

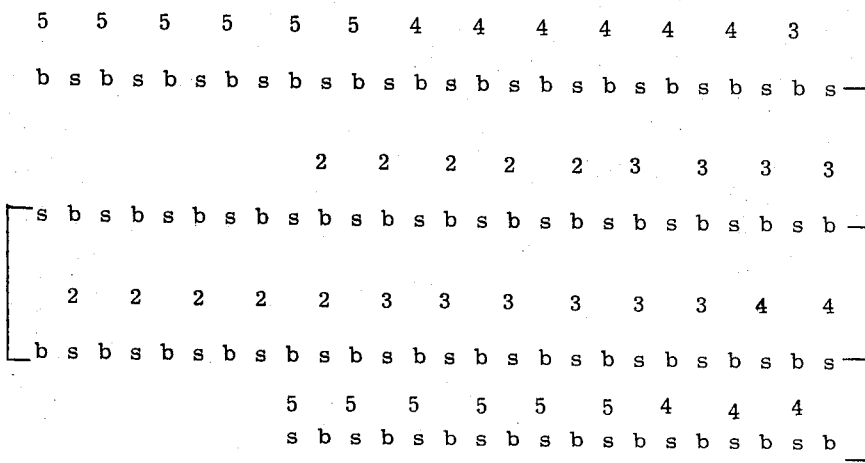

The absence of a numeral above the letters indicate a styrene-butadiene ratio or a butadiene-styrene ratio of 1 : 1. The chain portion with the tapering styrene-butadiene content is indicated by the abbreviation: $sb \rightarrow sb$ (wherein $\rightarrow$ indicates the direction of increasing styrene monomer unit content). The chain portions consisting of 100% styrene monomer units and 100% butadiene monomer units are abbreviated as $s-s$ and $b-b$, respectively. The chain portions containing random styrene and butadiene monomer units (with no tapering units) is abbreviated as $sb-sb$. Tapering styrene-butadiene copolymer chains can have the following structures, which are only a limited number of the types of combinations possible.

a. $s - b - sb \rightarrow sb \rightarrow s - s$
b. $s - s - b - b \rightarrow sb \rightarrow sb \rightarrow s - s$
c. $s - s \leftarrow sb \leftarrow sb \rightarrow 5b \rightarrow s - s$
d. $s - s \leftarrow sb \leftarrow sb \leftarrow b \leftarrow b - b \rightarrow sb \rightarrow sb$
$s - s$
e. $sb \rightarrow sb \rightarrow s - s - sb \rightarrow sb \rightarrow s - s$
f. $sb \leftarrow sb \rightarrow sb$
g. $sb \leftarrow sb \leftarrow b - b \rightarrow sb \rightarrow sb$

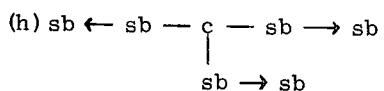

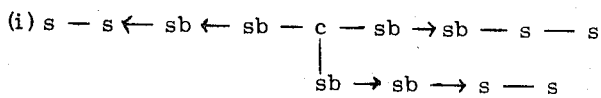

The letter *c* represents a coupler molecule or a catalyst which forms a branch in the polymer chain. Preferably, a low content of 1.2 vinyl bond units is maintained in the butadiene units of the micro-structure of the tapered styrene-butadiene copolymer. It is especially preferred to maintain less than 30% 1.2 vinyl bond units to the total butadiene monomer unit content.

The tapered styrene-butadiene copolymer can be prepared by the living anion polymerization method which is disclosed in applicants' copending U.S. Pat. application Ser. No. 134,391, filed Apr. 15, 1971, now abandoned. The following reactions are typical methods for the preparation of the tapered styrene-butadiene copolymer:

(a) $s - s - sb \rightarrow sb \rightarrow s - s$

Styrene is polymerized in the presence of an alkyl lithium catalyst in a non-polar hydrocarbon solvent such as benzene, cyclohexane, n-heptane or toluene. A mixture of butadiene and styrene is charged, after completion of the styrene polymerization reaction. Butadiene can be charged before completion of the styrene polymerization reaction. However, the tapering rate and the length of the tapering portion of the polymer chain are difficult to control by this process. Preferably, butadiene and styrene are separately charged to the reactor in the presence of a randomizer such as tetrahydrofuran, dimethyl ether, diethyl ether, anisole or amines, e.g., triethyl amine in order to control the ratio of butadiene to styrene. This procedure results in control of the length of the tapering portion of the copolymer chain in the styrene-butadiene system.

(b) $s - s - b - b \rightarrow sb \rightarrow sb \rightarrow s - s$

Styrene is polymerized in the presence of an alkyl lithium catalyst in a non-polar solvent. Butadiene is initially charged to the reactor after the polymerization of styrene, followed by a second charge of butadiene and styrene. The tapering rate and length of the tapering portion of the copolymer chain can be controlled by changing the rate of addition of butadiene and styrene.

(c) $s - s \leftarrow sb \leftarrow sb \rightarrow sb \rightarrow s - s$

Styrene is polymerized, and then butadiene and styrene are charged to the reactor in amounts which control the ratio of reactants in the presence of a randomizer. This is followed by the addition of styrene to the reactor. The copolymer may also be prepared by charging butadiene and styrene to the reactor in the presence of a dilithium ctalyst.

(d) $s - s \leftarrow sb \leftarrow sb \leftarrow b - b \rightarrow sb \rightarrow sb \rightarrow s - s$ Styrene is polymerized, and then butadiene and styrene are charged to the reactor to form the tapering portion of the $\leftarrow sb \leftarrow sb$ chain. Subsequently, butadiene is polymerized and the tapering portion of the $\rightarrow sb \rightarrow sb \rightarrow$ chain is formed. This is followed by the addition and polymerization of styrene. The copolymer may also be prepared by charging butadiene and styrene to the reactor in the presence of a dilithium catalyst.

(e) $sb \rightarrow sb \rightarrow s - s - sb \rightarrow sb \rightarrow s - s$

Styrene and butadiene are charged twice to a reactor in the presence of a non-polar hydrocarbon solvent containing an alkyl lithium catalyst. A multi-tapered copolymer can be prepared by repeating this process.

(f) $sb \leftarrow sb \rightarrow sb$

Styrene and butadiene are charged to a reactor in the presence of a non-polar hydrocarbon solvent containing a dilithium catalyst and a small amount of a randomizer or in the presence of a randomizer containing an alkyl lithium catalyst. The formation of the copolymer is influenced by control of the ratio of butadiene to styrene charged to the reactor.

(g) $sb \leftarrow sb \leftarrow b - b \rightarrow sb \rightarrow sb$

Butadiene is polymerized in a non-polar hydrocarbon solvent containing a dilithium catalyst, and then styrene and butadiene are charged to a reactor in the presence of a small amount of a randomizer while controlling the ratio of styrene and butadiene charged to the reactor. Styrene and butadiene may also be polymerized in the presence of a randomizer and an alkyl lithium catalyst.

(h)
$$sb \leftarrow sb - c - sb \rightarrow sb$$
$$| $$
$$sb \rightarrow sb$$

The $sb \leftarrow sb$ tapered copolymer is prepared by charging styrene and butadiene to a reactor in the presence of a non-polar hydrocarbon solvent containing a lithium catalyst and a small amount of a randomizer. Tapered copolymer chains are coupled by a coupler such as trichloro monomethyl silane, trichloro monoethyl silane, tribromomethane or tribromoethane.

(i) $s - s \leftarrow sb \leftarrow sb - c - sb \rightarrow sb - s - s$
$$| $$
$$sb \rightarrow sb \rightarrow s - s$$

The $sb \leftarrow sb$ tapered copolymer is bonded to a block styrene polymer and then coupled with a coupler. Various types of tapered copolymers may also be prepared by the use of a multi-functional coupler.

The amount of block styrene polymer can be measured by decomposing the tapered copolymer in the presence of a t-butyl hydroperoxide and osmium tetrachloride catalyst. Theh amount of separated block styrene polymer is determined by the following equation:

styrene block rate (%) = $\dfrac{\text{Separated block styrene polymer (wt.)}}{\text{Total copolymer (wt.)}} \times 100$ The amount of block styrene polymer can also be measured by infrared spectral measurements at 540 cm$^{-1}$.

The tapering rate of the polymer can be calculated by measuring the conversion rate and the styrene content at certain stages during the copolymerization reaction. The difference in the styrene content at two points in the chain is calculated, and the tapering rate is given by the following equation:

Tapering rate = $\dfrac{\text{Difference in the styrene content at two points in the chain}}{\text{Percentage of the weight of the chain portion to the weight of the total chain}}$ The structure of the tapered styrene-butadiene copolymer can be confirmed by the calculated tapering rate. The tapered styrene-butadiene copolymer should have a molecular weight of 4,000 – 250,000 in order to have excellent transparency, and impact strength characteristics, as well as the ability to resist formation of white mar and micro-cracks when the tapered copolymer is processed to form films. The term film means a film or sheet in any form. A lower molecular weight results in a copolymer with an inferior impact strength. A higher molecular weight copolymer results in inferior processing of the copolymer, especially as it relates to the formation of the unflown portion in the T-die. In addition, rough surfaces and low transparency arise during the inflation processing of the high molecular weight copolymers. The total styrene content of the tapered copolymer is preferably in the range of 60 – 90 weight percent. A lower styrene content results in a rubber-like product which has no advantages over conventional block copolymers. A styrene content greater than 90 weight percent results in a copolymer with a low impact strength, and a copolymer which forms micro-cracks when bent. Preferably, the copolymer chain contains more than 5% of a chain portion which has a tapering rate of 0.3 – 4 and a 30–70 weight percent styrene content. When the chain portion containing the tapering portion is lower than 5%, the impact strength is too low indicating that the styrene content should be decreased. The resulting film or sheet has a rubber-like property with rough surfaces and low transparency.

The tapered copolymer should contain a chain portion with a styrene content of at least 5% (but less than 50 weight percent styrene) between the two high styrene content chain portions which have a styrene content greater than 80 weight percent. This is referred to as the specific tapered structure. When a tapered styrene-butadiene copolymer does not possess this specific tapered structure, it has lower impact strength and elongation characteristics. When the tapered styrene-butadiene copolymer possesses the indicated specific tapered structure, it has high impact strength and elongation characteristics. In addition, the copolymers resist the formation of cracks when bent as well as possessing other attendant advantages over conventional styrene-butadiene block copolymers. Even though an $s — s \leftarrow sb \leftarrow sb \rightarrow sb \rightarrow s — s$ type tapered copolymer is admixed with an $sb \rightarrow sb \rightarrow s — s$ type tapered copolymer, the transparency, impact strength and elongation of the resulting composition are not substantially decreased. Accordingly, even though certain portions at the ends of the living polymer are inactivated by the polymerization process, the resulting polymer has no opaqueness as does the conventional block copolymer. When the tapered styrene-butadiene copolymer of this invention is formed as a thin film with its associated orientation of molecules, it possesses remarkable impact strength, especially against slow impact.

When the tapered styrene-butadiene copolymer is formed as a film less than 2 mm. thick, the film possesses remarkable characteristics such as a remarkable impact strength. The tapered styrene-butadiene copolymer can be formed without adding any plasticizer. Polystyrene may also be added to the tapered copolymer as it is formed into a film. The films and sheets prepared from the tapered styrene-butadiene copolymer or a mixture of the tapered copolymer with polystyrene, has all of the characteristics of a styrene film with improvements in transparency and impact strength. In addition, the copolymer does not form a white mar on bending or impact.

The process by which the films and sheets of the tapered styrene-butadiene copolymer or mixtures thereof of this invention are formed are not limited. These processes include known processes such as the T-die extrusion method, the inflation method, the calender method or the casting method. The characteristics of the films and sheets of the tapered styrene-butadiene copolymer or of the copolymer mixtures with polystyrene are as follows:

① Excellent transparency and surface luster.
② High mechanical strength, e.g., impact strength, tear strength and bending strength.
③ No white mar or cracks are formed upon bending or impact.
④ No moisture adherence and an excellent water repellency. The film does not change in length when subjected to a change in moisture. It is also dimensionally stable.
⑤ Suitable moisture and gas permeability.
⑥ No taste, no smell and no toxicity (no plasticizer is required).
⑦ Highly resistant to acid, alkali and aliphatic hydrocarbons, e.g., gasoline.
⑧ Excellent electric characteristics.
⑨ Excellent secondary processing characteristics (vacuum forming, pressure forming, cold processing, bending, cutting, heat sealing, adhesion, metalizing).
⑩ The tensile and impact strength do not decrease upon secondary processing with heat.
⑪ Good printability.
⑫ Heat shrinkable films can be formed.

The films and sheets of this invention can be used for a variety of applications, especially for packaging various foods. The films and sheets of this invention can be laminated while retaining their excellent transparency, surface luster and tear strength characteristics. A sheet of the tapered copolymers of this invention can be stretched by the application of pressure or a vacuum to the sheet with heat on a mold. The sheet conforms to the shape of the mold and gives rise to products such as cups and other containers.

Having generally described the invention, a further understanding can be obtained by reference to certain specific examples which are provided herein for purposes of illustration only and are not intended to be limiting unless otherwise specified.

EXAMPLE 1

The following five types of tapered styrene-butadiene copolymers were prepared in the presence of an alkyl lithium catalyst in a non-polar solvent at various ratios of styrene to the total monomer content. The resulting copolymers were extruded as films. The ratio of styrene to the total monomer content was 85 or 70% and the results are shown in Tables I, IV and VII. The type I tapered copolymer had the structure: $s — s — sb \rightarrow sb \rightarrow s — s$, and was prepared by process (a). The type II tapered copolymer had the structure: $s — s \leftarrow sb \leftarrow sb \rightarrow sb \rightarrow s — s$, and was prepared by process (c). The type III tapered copolymer had the structure: $(s — s \leftarrow sb \leftarrow sb)_3 c$, and was prepared by process (i).

Reference I: $s — s — b — b — s — s$

The reference $s-s-b-b-s-s$ block copolymer was prepared by polymerizing styrene in a non-polar hydrocarbon solvent in the presence of an alkyl lithium catalyst. This was followed by polymerization with butadiene and then styrene.

Reference II: $(s-s-b-b)_3c$

The reference $(s-s-b-b)_3c$ block copolymer was prepared by polymerizing styrene in a non-polar hydrocarbon solvent in the presence of an alkyl lithium catalyst. This was followed by polymerization with butadiene and coupling of the product with a trifunctional coupler.

Film-formation processes (A) T-die method

A tapered styrene-butadiene copolymer or a reference block copolymer was melted and extruded from a T-die extruder. The extruded material was pressed by a pair of rolling rollers, transferred through guide rollers and wound to yield a smooth sheet of uniform thickness. The sheet possessed a specific molecular orientation. The conditions for the film forming processes are shown in Table II wherein the roller pressure ranges from 0.25 to 25 kg/cm. Tear strength, elongation, impact strength, hardness, cloudiness and white mar of the polymer were measured. These results are shown in Table I. The thickness, tensile strength, elongation, breaking strength, tear strength, Elemendolf tear, thrust, bending resistance, strength and heat shrinkage properties of the film formed under the conditions listed in Table II are shown in Table III.

(B) Inflation method

The tapered styrene-butadiene copolymer shown in Table IV was processed by the inflation method to form a film. In the process, the molten copolymer was extruded from an annular slit having a 0.5 mm gap to form a tube. A specific amount of air was blown to stretch the film. The tubular film was solidified with cooling air from a cooling ring, and taken up through the guide rollers and knip rollers. The thickness and width of the film were determined by the die pressure, extrusion rate, take-up speed and air blow rate. Different thicknesses of the films were determined by calibrated positions of the cooling ring. The take-up speed ranged from 3 to 8 m/min and the diameter stretch rate was 2 – 5. Films possessing uniform thickness and high strength were produced by this process. The condition for film formation processes are shown in Table V. The characteristics of the resulting films are shown in Table VI.

(C) T-die method

The tapered styrene-butadiene copolymer shown in Table VII was processed according to the (A) T-die method to form sheets. The conditions for the sheet forming processes are shown in Table VIII, while their characterstics are shown in Table IX.

EXAMPLE 2

A tapered styrene-butadiene copolymer or a block copolymer was admixed with polystyrene of a 160,000 number average molecular weight and a 320,000 weight average molecular weight together with 0.25 weight percent of the anti-oxidant, 2,6-di-t-butyl-4-methyl phenol. The mixture was pelletized in a screw type extruder with a 20 mm diameter. The characteristics of the mixed polystyrene copolymer and the tapered styrene-butadiene copolymer, were measured. The characteristics of the mixture are shown in Tables X and XI. The mixed polystyrene copolymer and the tapered copolymers of this invention can be processed as films which possess excellent physical characteristics.

In Tables X and XI:

$A_1, A_2,: s-s-b-b-s-s$ type copolymer.
$B_1, B_2,: s-s-sb \rightarrow sb \rightarrow s-s$ type copolymer.
$C_1, C_2 ,: s-s \leftarrow sb \leftarrow sb \rightarrow sb \rightarrow s-s$ type copolymer.

(a) Total styrene content was measured by NMR.
(b) Number average molecular weights were measured by an osmotic pressure method.
(c) The amount of styrene block polymer was measured by decomposing the copolymer with t-butyl hydroperoxide and osmium tetrachloride.
(d) The rate of each chain portion to the total chain was measured by the curve of the chain length and the styrene-butadiene ratio which is calculated from the blocking rate from samples taken during the polymerization.
(e) Tensile strength and elongation were measured by a Damble type test piece having a thickness of 2 mm, a width of 10 mm, and a length of 80 mm.
(f) Impact strength was measured by a DIN method, with a test piece 2 mm thick and 10 cm wide.
(g) Hardness was measured by the ASTM–D–785 method.
(h) Cloudiness was measured by the ASTM–D–1003 method.
(i) Tensile strength and elongation were measured by the Japan Industrial Standard K–6872 method.
(j) Tear strength was measured by the Japan Industrial Standard K–6732 method.
(k) Elemendolf tear was measured by the Japan Industrial Standard P–8116 method.
(l) Thrust was measured by a film impact tester.
(m) Bending resistance strength was measured by bending both sides of a sample to a 90° angle with a 3 kg weight, and calculating the number of times the sample is bent until it is severed.
(n) Heat shrinkage was measured by heating in an oven.
(o) Dart drop impact strength was measured by dropping the rod with a spherical top (R=1.5 cm) from a 50 cm height.
(p) Permeability was measured by the Japan Industrial Standard Z–0208 method.
(q) Gas permeability was measured by the ASTM–0–1434–58 method.

TABLE I

| Type of Polymer | | Type I (1) | (2) | Type II (3) | (4) | Type III (5) | Reference I (6) | Reference II (7) |
|---|---|---|---|---|---|---|---|---|
| Total Styrene content Number of average | (a) | 85.3 | 85.1 | 84.5 | 85.7 | 84.8 | 85.8 | 85.0 |

TABLE I — Continued

| Type of Polymer | | Type I ① | Type I ② | Type II ③ | Type II ④ | Type III ⑤ | Reference I ⑥ | Reference II ⑦ |
|---|---|---|---|---|---|---|---|---|
| molecular weight (× 10⁴) | (b) | 15.2 | 14.8 | 15.3 | 15.0 | 15.6 | 14.7 | 15.8 |
| Styrene block rate (%) | (c) | 71.5 | 62.5 | 61.0 | 62.0 | 62.5 | 85.2 | 85.3 |
| Rate of chain portion with a tapering rate of 0.3–4 and a styrene content of 30–70 weight percent | (d) | 11.5 | 20.3 | 20.5 | 20.5 | 20.3 | — | — |
| Rate of chain portion with more than an 80 wt. (%) styrene content | (d) | 76.5 | 71.1 | 72.3 | 71.4 | 71.6 | 85.2 | 85.4 |
| Rate of chain portion with less than a 50 wt. (%) styrene content | (d) | 17.0 | 13.6 | 14.5 | 13.5 | 13.6 | 15.1 | 15.0 |
| Tensile strength (kg/cm²) | (e) | 377 | 360 | 345 | 352 | 366 | 401 | 393 |
| Elongation (%) | (e) | 91 | 105 | 107 | 117 | 110 | 44 | 39 |
| Impact strength (kg/cm) | (f) | 89 | 100 | 110 | 97 | 103 | 31 | 36 |
| Hardness Rockwell R-scale | (g) | 117 | 105 | 101 | 110 | 112 | 127 | 129 |
| Cloudiness (%) | (h) | 6.4 | 5.2 | 7.1 | 4.7 | 5.3 | 6.4 | 5.8 |
| White mar by bending | | none | none | none | none | none | cracks | cracks |

TABLE II

| Experiment number | Polymer | Temperature of cylinder (°C) C₁ | C₂ | C₃ | C₄ | C₅ | T-die D₁ | D₂ | D₃ | Screw rotation, r.p.m. | Temperature of roller (°C) R₁ | R₂ | R₃ | Roller rotation (r.p.m.) | Amount of extrusion (kg./hr.) | Speed of takeup (m./mim.) |
|---|---|---|---|---|---|---|---|---|---|---|---|---|---|---|---|---|
| 1 | ① ② ⑥ | 160 | 180 | 180 | 190 | 190 | 200 | 200 | 200 | 40 | 94 | 95 | 96 | 0.5 | 5.76 | 0.5 |
| 2 | ③ ④ ⑦ | 150 | 180 | 180 | 200 | 200 | 220 | 220 | 220 | 40 | 92 | 93 | 95 | 0.5 | 5.89 | 0.5 |
| 3 | ⑤ | 150 | 180 | 180 | 190 | 195 | 200 | 200 | 200 | 40 | 94 | 95 | 97 | 0.5 | 5.66 | 0.5 |

NOTE.—Extruder with a 40 mm. vent attach (L/D 22 screwpitch 40 mm.) was used. Physical properties of the sheet are shown in Table III.

TABLE III

| | Type I ① | | Type I ② | | Type II ③ | | Type II ④ | | Type III ⑤ | | Reference I ⑥ | | Reference II ⑦ | |
|---|---|---|---|---|---|---|---|---|---|---|---|---|---|---|
| Direction | Longitudinal | Horizontal | Longitudinal | Horizontal | Longitudinal | Horizontal | Longitudinal | Horizontal | Longitudinal | Horizontal | Longitudinal | Horizontal | Longitudinal | Horizontal |
| Average thickness (mm.) | 0.97 | 1.01 | 0.94 | 1.02 | 0.95 | 0.93 | 0.96 | 1.01 | 0.95 | 0.97 | 0.97 | 0.99 | 0.97 | 1.01 |
| Tensile test (i): Yield strength (kg./mm.²) | 4.2 | 4.0 | 3.8 | 3.6 | 3.9 | 3.5 | 3.9 | 3.6 | 3.7 | 3.5 | 4.6 | 4.4 | 4.7 | 4.4 |
| Elongation (percent) | 70 | 64 | 120 | 110 | 110 | 90 | 108 | 98 | 108 | 95 | 20 | 18 | 19 | 17 |
| Braking strength (kg./mm.²) | 2.1 | 1.9 | 2.0 | 1.9 | 2.1 | 1.9 | 2.2 | 1.9 | 2.0 | 1.8 | 1.7 | 1.5 | 1.7 | 1.4 |
| Tear strength (kg./mm.²) (j) | 10.3 | 10.1 | 13.8 | 13.2 | 14.6 | 13.1 | 14.7 | 13.9 | 14.4 | 13.0 | 3.8 | 3.6 | 4.0 | 3.9 |
| Elemendolf tear strength (g.) (k) | <3,200 | 2,900 | <3,200 | <3,200 | <3,200 | <3,200 | <3,200 | <3,200 | <3,200 | <3,200 | 450 | 380 | 430 | 390 |
| Thrust (kg. cm./mm.) (l) | 7.8 | 7.8 | 8.4 | 8.4 | 8.0 | 8.0 | 8.8 | 8.8 | 8.5 | 8.5 | 3.2 | 3.2 | 3.0 | 3.0 |
| Bending resistance strength (3 kg. weight terms) (m) | 51 | 87 | 73 | 134 | 62 | 123 | 84 | 110 | 90 | 144 | 14 | 20 | 16 | 21 |
| Heat shrinkage (percent 1 minute) (n) | −28 | 7 | −30 | 6 | −30 | 5 | −29 | −5 | −32 | 6 | −29 | 7 | −29 | 8 |

TABLE IV

| Type of Polymer | | Type I ① | Type I ② | Type II ③ | Type II ④ | Type III ⑤ | Reference I ⑥ | Reference II ⑦ |
|---|---|---|---|---|---|---|---|---|
| Total Styrene Content | (a) | 80.4 | 79.5 | 80.0 | 80.2 | 79.8 | 79.8 | 80.5 |
| Number average molecular weight (× 10⁴) | (b) | 12.4 | 13.1 | 11.9 | 13.0 | 13.7 | 11.9 | 13.5 |
| Styrene block rate (%) | (c) | 67.0 | 55.5 | 55.0 | 55.0 | 54.5 | 80.0 | 79.0 |
| Rate of chain portion with a tapering rate of 0.3–4 and a styrene content of 30–70 wt.(%) | (d) | 11.4 | 20.3 | 19.1 | 21.0 | 19.8 | — | — |
| Rate of chain portion with more than an 80 wt.(%) styrene content | (d) | 70.3 | 65.2 | 64.9 | 65.7 | 64.9 | 80.5 | 79.0 |
| Rate of chain portion with less than a 50 wt. (%) styrene content | (d) | 24.0 | 21.1 | 22.7 | 20.1 | 18.9 | 19.5 | 21.0 |
| Tensile strength (kg/cm²) | (e) | 320 | 298 | 295 | 300 | 302 | 350 | 362 |
| Elongation (%) | (e) | 110 | 149 | 150 | 145 | 146 | 69 | 62 |
| Impact strength (kg/cm) | (f) | 128 | 142 | 145 | 145 | 139 | 55 | 52 |
| Hardness Rockwell R-scale | (g) | 108 | 97 | 94 | 98 | 98 | 119 | 123 |
| Cloudiness (%) | (h) | 6.0 | 5.3 | 4.0 | 4.7 | 5.1 | 5.7 | 6.4 |
| White mar by bending | | none | none | none | none | none | cracks | cracks |

TABLE V

| Experiment No. | Polymer | Temperature of cylinder (° C.) | | | | | T-die | | | Screw rotation, r.p.m. | Amount of extrusion (kg./hr.) | Take-up speed (m./min.) | Stretch | Rate of blow | Total elongation rate |
|---|---|---|---|---|---|---|---|---|---|---|---|---|---|---|---|
| | | $C_1$ | $C_2$ | $C_3$ | $C_4$ | $C_5$ | $D_1$ | $D_2$ | $D_3$ | | | | | | |
| 1 | ③④⑥ | 140 | 150 | 160 | 160 | 170 | 170 | 180 | 180 | 40 | 6.2 | 5 | 7.3 | 2.2 | 16.1 |
| 2 | ①②⑤ | 150 | 162 | 165 | 165 | 170 | 170 | 180 | 180 | 40 | 5.9 | 5 | 7.1 | 2.1 | 14.9 |
| 3 | ⑦ | 140 | 160 | 165 | 165 | 170 | 175 | 185 | 185 | 50 | 6.7 | 6 | 6.8 | 2.4 | 16.3 |

TABLE VI

| | Polymer of— | | | | | | | | | | | | | |
|---|---|---|---|---|---|---|---|---|---|---|---|---|---|---|
| | Type I | | | | Type II | | | | Type III | | Reference I | | Reference II | |
| | ① | | ② | | ③ | | ④ | | ⑤ | | ⑥ | | ⑦ | |
| Direction | Longi-tudinal | Hori-zontal | Longi-tudinal | Hori-zontal | Longi-tudinal | Hori-zontal | Longi-tudinal | Hori-zontal | Longi-tudinal | Hori-zontal | Longi-tudinal | Hori-zontal | Longi-tudinal | Hori-zontal |
| Average thickness ($\mu$) | 38 | 38 | 42 | 42 | 43 | 43 | 41 | 41 | 45 | 45 | 37 | 37 | 42 | 42 |
| Tensile test (i): | | | | | | | | | | | | | | |
| Yield strength (kg./mm.$^2$) | 2.7 | 2.4 | 2.4 | 2.1 | 2.5 | 2.2 | 2.4 | 2.3 | 2.3 | 2.1 | 3.0 | 2.9 | 3.1 | 2.8 |
| Elongation (percent) | 200 | 170 | 230 | 220 | 240 | 210 | 210 | 220 | 225 | 210 | 55 | 52 | 59 | 54 |
| Breaking strength (kg./mm.$^2$) | 2.4 | 1.9 | 2.2 | 2.1 | 2.4 | 1.9 | 2.3 | 2.0 | 2.2 | 1.9 | 2.9 | 2.8 | 3.0 | 2.7 |
| Tear strength (kg./mm.$^2$) (j) | 7.8 | 5.8 | 8.2 | 6.5 | 8.0 | 6.1 | 7.8 | 6.3 | 7.9 | 6.2 | 5.2 | 4.3 | 5.3 | 4.5 |
| Elemendolf tear (g.) | 45 | 33 | 51 | 36 | 48 | 39 | 50 | 37 | 45 | 39 | 8.5 | 7.6 | 8.2 | 7.3 |
| Thrust (kg. cm./mm.) (l) | 17.2 | 17.2 | 20.5 | 20.5 | 20.9 | 20.9 | 19.5 | 19.5 | 19.0 | 19.0 | 6.5 | 6.5 | 7.0 | 7.0 |
| Dart drop impact strength (g. cm./$\mu$) (o) | 95 | 95 | 115 | 115 | 120 | 120 | 110 | 110 | 115 | 115 | 5.0 | 5.0 | 7.0 | 7.0 |
| Permeability (g. mm./m.$^2$/24 hrs.) (p) | 2.24 | 2.24 | 2.30 | 2.30 | 2.40 | 2.40 | 2.35 | 2.35 | 2.38 | 2.38 | 2.41 | 2.41 | 2.46 | 2.46 |
| Gas permeability (cc. cm./m.$^2$/sec. cm. Hg): | | | | | | | | | | | | | | |
| $O_2$ ($\times 10^{-10}$) | 1.54 | 1.54 | 1.56 | 1.56 | 1.59 | 1.59 | 1.52 | 1.52 | 1.53 | 1.53 | 1.57 | 1.57 | 1.50 | 1.50 |
| $CO_2$ ($\times 10^{-10}$) (q) | 9.47 | 9.47 | 9.40 | 9.40 | 9.57 | 9.57 | 9.31 | 9.31 | 9.52 | 9.52 | 9.60 | 9.60 | 9.59 | 9.59 |
| Heat shrinkage (percent 1 minute) (n) | 42 | 33 | 41 | 35 | 40 | 31 | 38 | 34 | 37 | 33 | 12 | 10 | 13 | 12 |

TABLE VII

| Type of Polymer | | Type I | | Type II | | Type III | Reference | |
|---|---|---|---|---|---|---|---|---|
| | | ① | ② | ③ | ④ | ⑤ | ⑥ | ⑦ |
| Total Styrene Content | (a) | 70.4 | 70.8 | 69.9 | 70.2 | 70.5 | 70.5 | 70.4 |
| Number average molecular weight ($\times 10^4$) | (b) | 9.1 | 8.8 | 8.5 | 9.0 | 10.2 | 8.9 | 9.7 |
| Styrene block rate (%) | (c) | 57.5 | 39.5 | 47.5 | 40.0 | 40.5 | 709.2 | 70.6 |
| Rate of chain portion with a tapering rate of 0.3–4 and a styrene content of 30–70 wt.(%) | (d) | 6.3 | 25.8 | 12.4 | 25.3 | 26.0 | — | — |
| Rate of chain portion with more than a 30% wt.(%) styrene content | (d) | 61.0 | 51.7 | 54.1 | 52.2 | 51.5 | 70.2 | 70.9 |
| Rate of chain portion with less than a 50 wt.(%) styrene content | (d) | 35.6 | 29.6 | 36.5 | 30.2 | 29.5 | 30.1 | 31.0 |
| Tensile strength (kg/cm$^2$) | (e) | 153 | 130 | 132 | 140 | 135 | 200 | 195 |
| Elongation (%) | (e) | 360 | 420 | 450 | 400 | 450 | 210 | 210 |
| Impact strength (kg/cm) | (f) | 150< | 150< | 150< | 150< | 150< | 85 | 90 |
| Hardness Rockwell R-scale | (g) | 39 | 28 | 30 | 32 | 31 | 55 | 54 |
| Cloudiness (%) | (h) | 12.2 | 10.6 | 11.7 | 11.5 | 12.4 | 11.5 | 11.2 |
| White mar by bending | | none | none | none | none | none | none | none |

TABLE VIII

| Experiment No. | Polymer | Temperature of cylinder (° C.) | | | | | T-die | | | Screw rotation, r.p.m. | Temperature of roller (° C.) | | | Roller rotation (r.p.m.) | Amount of extrusion (kg./hr.) | Speed of take-up (m./min.) |
|---|---|---|---|---|---|---|---|---|---|---|---|---|---|---|---|---|
| | | $C_1$ | $C_2$ | $C_3$ | $C_4$ | $C_5$ | $D_1$ | $D_2$ | $D_3$ | | $R_1$ | $R_2$ | $R_3$ | | | |
| 1 | ①②⑤⑥ | 165 | 180 | 180 | 190 | 190 | 200 | 200 | 200 | 40 | 91 | 92 | 94 | 0.5 | 5.61 | 0.5 |
| 2 | ③④⑦ | 170 | 180 | 190 | 200 | 200 | 200 | 200 | 200 | 40 | 92 | 93 | 94 | 0.5 | 5.67 | 0.5 |

TABLE IX

| Direction | Polymer of— | | | | | | | | | | | | | |
|---|---|---|---|---|---|---|---|---|---|---|---|---|---|---|
| | Type I | | | | Type II | | | | Type III | | Reference I | | Reference II | |
| | ① | | ② | | ③ | | ④ | | ⑤ | | ⑥ | | ⑦ | |
| | Longitudinal | Horizontal | Longitudinal | Horizontal | Longitudinal | Horizontal | Longitudinal | Horizontal | Longitudinal | Horizontal | Longitudinal | Horizontal | Longitudinal | Horizontal |
| Average thickness ($\mu$) | 0.98 | 0.98 | 0.99 | 0.99 | 0.97 | 0.97 | 1.10 | 1.10 | 0.99 | 0.99 | 0.98 | 0.98 | 1.00 | 1.00 |
| Tensile test (i); | | | | | | | | | | | | | | |
| Yield strength (kg./mm.²) | 1.5 | 1.3 | 1.3 | 1.1 | 1.3 | 1.2 | 1.4 | 1.1 | 1.3 | 1.2 | 1.8 | 1.6 | 1.9 | 1.7 |
| Elongation (percent) | 350 | 330 | 420 | 400 | 440 | 410 | 430 | 420 | 410 | 400 | 230 | 210 | 210 | 200 |
| Breaking strength (kg./mm.²) | 1.4 | 1.2 | 1.2 | 1.1 | 1.2 | 1.0 | 1.3 | 1.1 | 1.0 | 1.1 | 1.7 | 1.4 | 1.7 | 1.5 |
| Tear strength (kg./mm.²) (j) | 12.4 | 11.6 | 15.2 | 14.8 | 15.6 | 15.2 | 14.9 | 15.1 | 15.5 | 15.0 | 10.5 | 10.2 | 10.6 | 10.1 |
| Elemendolf tear strength (g.) (k) | <3,200 | <3,200 | <3,200 | <3,200 | <3,200 | <3,200 | <3,200 | <3,200 | <3,200 | <3,200 | 1,100 | 1,000 | 1,200 | 1,100 |
| Thrust (kg./cm./mm.) (l) | 8.6 | 8.6 | 9.3 | 9.3 | 9.8 | 9.8 | 9.6 | 9.6 | 9.9 | 9.9 | 5.3 | 5.3 | 5.6 | 5.6 |
| Bending resistance strength (3 kg. weight terms) (m) | 662 | 681 | 752 | 773 | 781 | 742 | 765 | 789 | 758 | 771 | 232 | 245 | 273 | 281 |
| Heat shrinkage (percent 1 min.) (n) | −21 | 4 | −24 | 3 | −26 | 5 | −23 | 4 | −25 | 6 | −20 | 3 | −22 | 4 |

TABLE X

| Type of polymer | Polystyrene | Block copolymer ($A_1$) | Tapered copolymer ($B_1$) | Tapered copolymer ($C_1$) | PSt:$A_1$ =1:1 | PSt:$B_1$ =1:1 | PSt:$C_1$ =1:1 | PSt:$B_1$ =2:1 | PSt:$C_1$ =2:1 |
|---|---|---|---|---|---|---|---|---|---|
| Total styrene content (a) | 100 | 80 | 80 | 80 | 90 | 90 | 90 | 93.3 | 93.3 |
| Number average molecular weight (×10⁴) (b) | 16 | 10.5 | 10.3 | 10.6 | | | | | |
| Styrene block rate (percent) (c) | 100 | 80 | 67 | 55 | | | | | |
| Rate of chain portion with a tapering rate of 0.3–4 and a styrene content of 30–70 wt. (percent) (d) | 0 | 0 | 33 | 45 | | | | | |
| Rate of chain portion with more than an 80 wt. (percent) styrene content (d) | 100 | 80 | 70 | 64 | | | | | |
| Rate of chain portion with less than a 50 wt. (percent) styrene content (d) | 0 | 20 | 28 | 32 | | | | | |
| Tensile strength (kg./cm.²) (e) | 456 | 380 | 330 | 290 | 430 | 410 | 380 | 415 | 390 |
| Elongation (percent) (e) | 4 | 75 | 105 | 170 | 10 | 45 | 70 | 30 | 50 |
| Impact strength (kg./cm.) (f) | 8 | 31 | 89 | 130 | 10 | 35 | 45 | 25 | 35 |
| Hardness Rockwell R-scale (g) | 65 | 41 | 31 | 12 | 50 | 48 | 41 | 50 | 46 |
| Cloudiness (percent) (h) | 4.0 | 7.8 | 8.0 | 6.5 | 9.5 | 7.0 | 5.5 | 6.5 | 5.7 |
| White mar by bending | Broken | Cracks | None | None | Broken | None | None | Cracks | None |

TABLE XI

| Type of polymer | Polystyrene | Block copolymer ($A_2$) | Tapered copolymer ($B_2$) | Tapered copolymer ($C_2$) | PSt:$A_2$ =4:1 | PSt:$B_2$ =4:1 | PSt:$C_2$ =4:1 | PSt:$B_2$ =1:1 | PSt:$C_1$ =1:1 |
|---|---|---|---|---|---|---|---|---|---|
| Total styrene content (a) | 100 | 60 | 60 | 60 | 92 | 92 | 92 | 80 | 80 |
| Number average molecular weight (×10⁴) (b) | 16 | 8.0 | 7.9 | 7.7 | | | | | |
| Styrene block rate (percent) (c) | 100 | 60 | 51 | 38 | | | | | |
| Rate of chain portion with a tapering rate of 0.3–4 and a styrene content of 30–70 wt. (percent) (d) | 0 | 0 | 49 | 60 | | | | | |
| Rate of chain portion with more than an 80 wt. (percent) styrene content (d) | 100 | 60 | 51 | 45 | | | | | |
| Rate of chain portion with less than a 50 wt. (percent) styrene content (d) | 0 | 40 | 47 | 53 | | | | | |
| Tensile strength (kg./cm.²) (e) | 456 | 252 | 237 | 221 | 442 | 440 | 415 | 332 | 315 |
| Elongation (percent) (e) | 4 | 700 | 900 | 900 | 13 | 25 | 45 | 112 | 125 |
| Impact strength (kg./cm.) (f) | 8 | | | | 15 | 35 | 45 | 75 | 89 |
| Hardness Rockwell R-scale (g) | 65 | 5 | | | 45 | 43 | 38 | 23 | 21 |
| Cloudiness (percent) (h) | 4.0 | 15.0 | 13.5 | 11.5 | 80 | 55 | 20 | 61 | 22 |
| White mar by bending | Broken | None | None | None | Mar | (¹) | None | None | None |

¹ Small mar.

Having now fully described the invention, it will be apparent to one of ordinary skill in the art that many changes and modifications can be made thereto without departing from the spirit or scope of the invention as set forth herein.

Accordingly what is claimed as new and intended to be covered by letters patent is:

1. A process for producing a film or sheet from a tapered styrene-butadiene copolymer or mixture thereof which comprises melt-extruding through a T die extruder wherein the temperature of the cylinder of the extruder is 140 to 200° and the temperature of the die is from 170° to 220° and stretching at a stretch roller pressure of 0.25 to 25 Kg/cm² a tapered styrene-butadiene copolymer with a molecular weight of 40,000 – 250,000, a total styrene content of 60 – 90 weight percent, and a total butadiene content of 40 – 10 weight percent, wherein said tapered styrene-butadiene copolymer contains: (a) more than 5% of the chain portion having a tapering rate of 0.3 – 4 and a styrene content of 30 – 70 weight percent, (b) more than 35% of the chain portion with a styrene content of more than 80% by weight, and (c) more than 10% of the chain portion with a styrene content from at least 5 weight percent to less than 50 weight percent between high styrene content chain portions which have a styrene content of greater than 80 weight percent.

2. The process of claim 1, wherein said melt-extruding and stretching is conducted by the T-die method whereby a bi-axial orientation is imparted to the tapered copolymer.

3. The process of claim 1, wherein said tapered styrene-butadiene copolymer is admixed with polystyrene together with an anti-oxidant and the mixture is melt-extruded and stretched by a T-die method.

4. The process of claim 1, wherein said tapered styrene-butadiene copolymer or a mixture of the tapered copolymer and polystyrene is melt-extruded and stretched to form a film less than 2 mm thick.

* * * * *